United States Patent
de Leeuw et al.

(10) Patent No.: US 9,693,094 B2
(45) Date of Patent: Jun. 27, 2017

(54) MEDIA CONTENT SUBSCRIPTION ENFORCEMENT FOR A MEDIA CONTENT RECEIVER

(75) Inventors: Herman Josephus Johan de Leeuw, Almelo (NL); Hillegienus Takens, Aadorp (NL)

(73) Assignee: EchoStar Technologies L.L.C., Englewood, CO (US)

( * ) Notice: Subject to any disclaimer, the term of this patent is extended or adjusted under 35 U.S.C. 154(b) by 43 days.

(21) Appl. No.: 12/961,949

(22) Filed: Dec. 7, 2010

(65) Prior Publication Data

US 2011/0138438 A1    Jun. 9, 2011

Related U.S. Application Data

(60) Provisional application No. 61/267,996, filed on Dec. 9, 2009.

(51) Int. Cl.
*H04N 21/4627* (2011.01)
*H04N 21/436* (2011.01)
(Continued)

(52) U.S. Cl.
CPC .  *H04N 21/43615* (2013.01); *H04N 21/25816* (2013.01); *H04N 21/25875* (2013.01);
(Continued)

(58) Field of Classification Search
CPC ......... H04N 21/25816; H04N 21/4405; H04N 21/25875; H04N 21/26606;
(Continued)

(56) References Cited

U.S. PATENT DOCUMENTS

| 6,584,199 B1 * | 6/2003 | Kim | H04N 7/163 348/E7.056 |
|---|---|---|---|
| 2003/0097563 A1 * | 5/2003 | Moroney | H04N 7/163 713/170 |

(Continued)

FOREIGN PATENT DOCUMENTS

| EP | 1463319 | * 9/2004 | ............... H04N 7/16 |
|---|---|---|---|
| WO | WO 97/35430 | 9/1997 | |
| WO | WO 03/105437 | 12/2003 | |

OTHER PUBLICATIONS

"Digital Satellite Equipment Control (DiSEqC)", BUS Functional Specification, Eutelsat, Version 4.2, Feb. 25, 1998, 28 pages.

(Continued)

*Primary Examiner* — Robert Hance
(74) *Attorney, Agent, or Firm* — LK Global (57) ABSTRACT

A method of enforcing a media content subscription for a media content receiver is presented. In the method, a media content receiver is determined to be a primary receiver or a secondary receiver. If the media content receiver is determined to be a primary receiver, the primary receiver is operated according to a content subscription associated with the primary receiver, and communication with a secondary receiver is attempted. If the media content receiver is determined to be a secondary receiver, and the primary receiver communicates with the secondary receiver, the secondary receiver is operated according to a content subscription associated with the secondary receiver. If the primary receiver does not communicate with the secondary receiver, the secondary receiver is operated at a reduced level than determined by the content subscription of the secondary receiver.

10 Claims, 5 Drawing Sheets

(51) Int. Cl.
  *H04N 21/258* (2011.01)
  *H04N 21/266* (2011.01)
  *H04N 21/4623* (2011.01)
  *H04N 21/647* (2011.01)
  *H04N 21/6334* (2011.01)

(52) U.S. Cl.
  CPC ... *H04N 21/26606* (2013.01); *H04N 21/4623* (2013.01); *H04N 21/4627* (2013.01); *H04N 21/6334* (2013.01); *H04N 21/647* (2013.01)

(58) Field of Classification Search
  CPC ........... H04N 21/4623; H04N 21/6334; H04N 21/647; H04N 21/43615; H04N 21/4627
  See application file for complete search history.

(56) References Cited

U.S. PATENT DOCUMENTS

| | | | | |
|---|---|---|---|---|
| 2004/0123097 | A1* | 6/2004 | Ranjan | G11B 20/00086 713/153 |
| 2004/0210924 | A1* | 10/2004 | Duffield | H04N 7/163 725/25 |
| 2005/0071866 | A1* | 3/2005 | Louzir | H01Q 1/125 725/31 |
| 2005/0147247 | A1 | 7/2005 | Westberg et al. | |
| 2006/0033840 | A1* | 2/2006 | Diehl | H04N 7/163 348/468 |
| 2006/0101526 | A1* | 5/2006 | Sachot | H04L 63/10 726/29 |
| 2006/0168633 | A1* | 7/2006 | Han | H04H 60/21 725/100 |
| 2007/0242633 | A1* | 10/2007 | Roberts | H04H 40/90 370/312 |
| 2007/0277195 | A1* | 11/2007 | Nishigaki | H04H 60/43 725/34 |
| 2008/0271106 | A1* | 10/2008 | Patel | H04N 21/42204 725/118 |
| 2010/0162290 | A1* | 6/2010 | Mountain | 725/25 |
| 2011/0083141 | A1* | 4/2011 | Westberg | H04N 21/4122 725/31 |

OTHER PUBLICATIONS

"DiSEqC", retrieved from Wikipedia internet site located at http://en.wikipedia.org/w/index.php?title=DiSEqC on Nov. 25, 2009, 2 pages.
International Search Report and Written Opinion dated Mar. 29, 2011, PCT/EP2010/069298, 9 pages.
European Patent Office, Communication pursuant to Article 94(3) EPC in Application No. 10 790 935.0-1905 mailed Oct. 13, 2015.

* cited by examiner

MEDIA CONTENT SUBSCRIPTION ENFORCEMENT FOR A MEDIA CONTENT RECEIVER

RELATED APPLICATIONS

This application claims the benefit of U.S. Provisional Application No. 61/267,996, entitled "MEDIA CONTENT SUBSCRIPTION ENFORCEMENT FOR A MEDIA CONTENT RECEIVER", and filed Dec. 9, 2009. The provisional application is hereby incorporated herein in its entirety.

BACKGROUND

Generally speaking, media content receivers facilitate the delivery of media content from a content provider to a subscriber of the content. For example, a television content receiver, such as a satellite or cable television set-top box, typically delivers hundreds of television programming channels from a television content provider for viewing on a television connected to the set-top box. Oftentimes, the subscriber may subscribe to the service according to any of several different subscription packages or levels, with each level being associated with a different amount of media content available to the subscriber's set-top box. For example, the subscriber may subscribe to any of a basic subscription package allowing the subscriber to view programming broadcast on local television stations and some cable networks, more enhanced packages that include the basic package content plus some regional sports channels, and premium packages that include enhanced package content in addition to one or more movie channels. Another subscription augmentation may be to include high definition content in addition to standard definition programs.

In many cases, the subscriber may wish to utilize multiple receivers at the subscriber's residence to allow viewing of the subscribed media content in several different locations within the home. To help satisfy this desire, the service provider may provide a main or primary subscription to be associated with one of the media content receivers, and one or more less costly (or possibly free) secondary subscriptions, each of which is associated with a secondary receiver within the same home. Thus, the same level of media content may be accessible via the primary receiver and one or more secondary receivers, albeit at a reduced overall subscription cost than if each subscription were purchased for a separate household.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
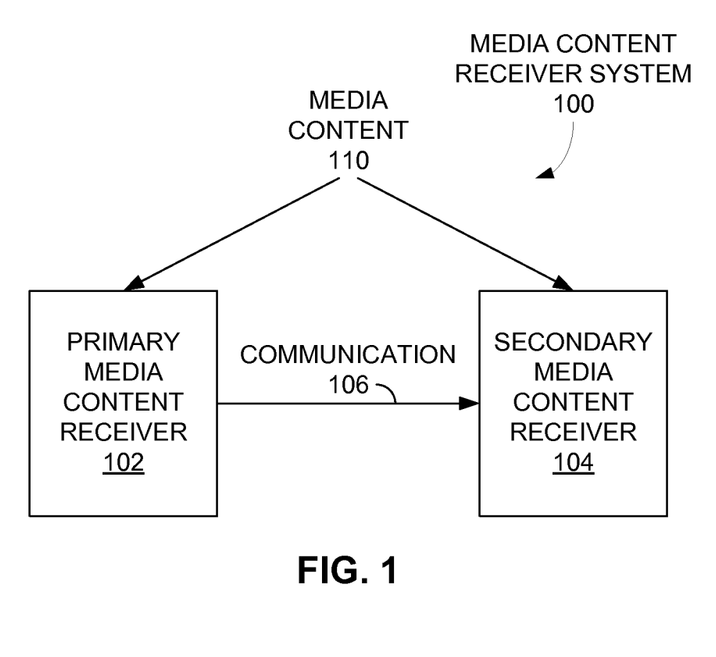
FIG. 1 is a simplified block diagram of a media content receiver system according to an embodiment of the invention.

FIG. 1 is a simplified block diagram of a media content receiver system 100 according to an embodiment of the invention. As shown, the media content receiver system 100 includes a primary media content receiver 102 and a secondary media content receiver 104, each of which are configured to receive media content 110 for the benefit of a subscriber. Generally speaking, the primary receiver 102 is configured to operate unconditionally at a level described by a subscription associated with the primary receiver 102. In contract, the secondary receiver 104 may only fully operate as described by a subscription corresponding with the secondary receiver 104 if the secondary receiver 104 is communicatively coupled with the primary receiver 102. In one implementation, such communicative coupling may indicate that the two receivers 102, 104 both remain under the control of a single subscriber, thus satisfying the conditions under which the service provider of the media content 110 makes the primary and secondary media content subscriptions available.

Depending on the particular receivers 102, 104 involved, the media content 110 being received may be any of several types of media content, such as audio and/or video content, including television content and/or radio content. Further, television content may include satellite, cable, and/or terrestrial ("over-the-air") television content. Radio content may be delivered in a similar fashion. In other examples, the media content 110 may be textual in nature, or any other kind of media content to be viewed or otherwise consumed by a user. Accordingly, the receivers 102, 104 may be any receiver configured to receive such content, including, but not limited to, set-top boxes, televisions, radios, mobile communication devices, and desktop and laptop computers.

Figure 2:
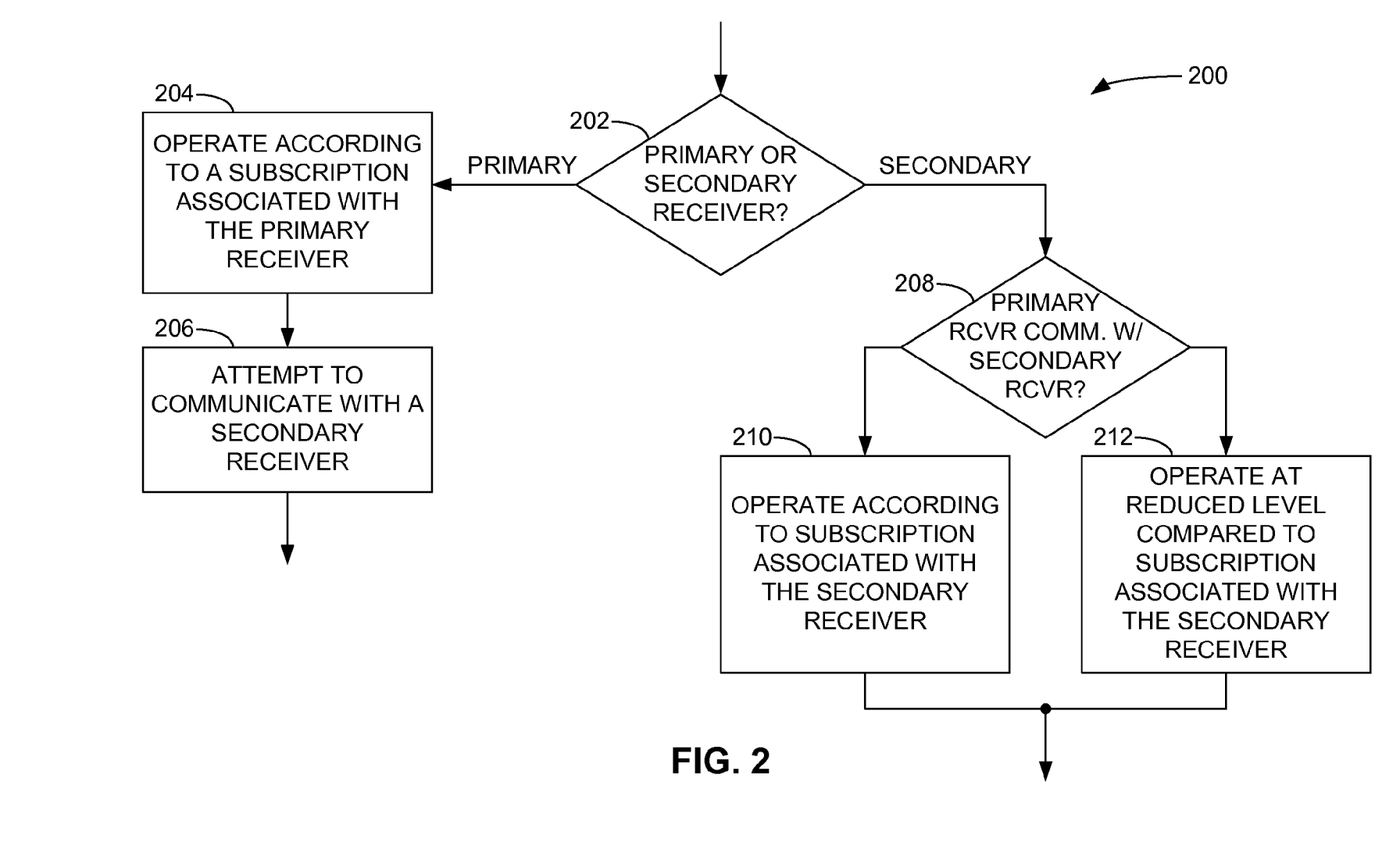
FIG. 2 is a flow diagram of a method according to an embodiment of the invention of enforcing a media content subscription for a media content receiver.

FIG. 2 presents a method 200 of enforcing a media content subscription for a media content receiver, such as either of the receivers 102, 104 of FIG. 1. In the method 200, a determination is made as to whether the media content receiver is a primary receiver or a secondary receiver (operation 202). If the receiver is a primary receiver, the primary receiver is operated according to a content subscription associated with the primary receiver (operation 204). Also, the primary receiver attempts to communicate with a secondary receiver (operation 206). If, instead, the media content receiver is determined to be a secondary receiver (operation 202), and a primary receiver communicates with the secondary receiver (operation 208), the secondary receiver is configured to operate according to a content subscription associated with the secondary receiver (operation 210). Otherwise, if the primary receiver is unable to communicate with the secondary receiver (operation 208), the secondary receiver is configured to operate at a reduced level compared to the subscription associated with the secondary receiver (operation 212).

While the operations of FIG. 2 are depicted as being executed in a particular order, other orders of execution, including concurrent or overlapping execution of two or more operations, may be possible. In another embodiment, a computer-readable storage medium may have encoded thereon instructions for a processor or other control circuitry of the media content receiver 102, 104 of FIG. 1 to implement the method 200.

The method 200 may thus enforce a media content subscription for a media content receiver by preventing a secondary receiver (i.e., a receiver associated with a secondary media content subscription) from operating at the full level of its subscription if a primary receiver is unable to communicate with the secondary receiver. In one implementation, such communication may be possible only if the secondary receiver and the primary receiver remain under the control of the subscriber, such as if the receivers are employed within the same residence or similar location. Thus, such a method may prevent a subscriber from allowing another individual to use the secondary receiver in another dwelling or area separate from that of the primary receiver. Additional advantages may be recognized from the various implementations of the invention discussed in greater detail below.

Figure 3:
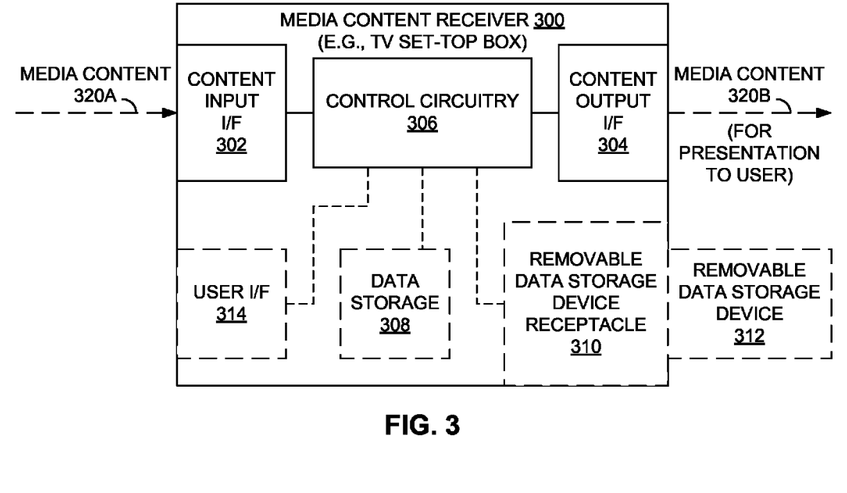
FIG. 3 is a block diagram of a media content receiver that may serve as either a primary media content receiver or a secondary media content receiver according to an embodiment of the invention.

FIG. 3 provides a block diagram of a media content receiver 300 according to an embodiment of the invention. In this case, the media content receiver 300 is presumed to be a television set-top box, such a satellite or cable television receiver, although other types of receivers may be employed in other embodiments. The receiver 300 includes a content input interface 302, a content output interface 304, and control circuitry 306. Additionally, the receiver 300 may include any of data storage 308, a removable data storage receptacle 310, and a user interface 314. Further possible aspects, such as a power supply, mechanical enclosure, storage for received media content, and other items, may be incorporated in the receiver 300, but such aspects are not discussed extensively hereinafter in order to simplify and focus the following discussion.

The content input interface 302 is configured to receive media content 320A. In the case of a television set-top box, the content input interface 302 may include circuitry to receive the content 320A from a satellite antenna, a coaxial cable coupled with a cable head-end, and/or a terrestrial antenna, and further process the received content 320A, such as by down-converting, decoding, and/or decrypting the received content 320A. The content input interface 302 may also include one or more tuners or other content selection resources for selecting a particular portion of the content 320A, such as a specific programming channel. Other circuitry performing additional tasks may also be included in the content input interface 302.

The content output interface 304 is configured to transfer at least a portion of the received media content 320A as media content 320B for presentation to a user. Depending on the particular implementation, the media content 320B may be presented directly to the user, typically via a visual display and/or audio speakers. However, in the case of a set-top box, the content output interface 304 may provide the content 320B to an external display or other device for presentation of the content 320B, such as via a High Definition Multimedia Interface (HDMI) connection, a composite or component video connection with a separate audio connection, or a modulated audio/video connection. Under either scenario, the content output interface 304 may translate, encode, or otherwise process the media content 320B prior to transferring the content 320B for presentation to the user.

The control circuitry 306 of the receiver 300, coupled with the content input interface 302 and the content output interface 304, performs the bulk of the actions required to enforce a media content subscription for the receiver 300, as described in greater detail below. The control circuitry 306 may also perform any other tasks necessary to allow the receiver 300 to perform its duties as a receiver 300. The control circuitry 306 may include one or more processors, such as a microprocessor, microcontroller, or digital signal processor (DSP), configured to execute instructions directing the processor to perform the functions discussed more fully herein. In another implementation, the control circuitry 306 may be strictly hardware-based logic, or may include a combination of hardware, firmware, and/or software elements.

In operation, the control circuitry 306 is configured to determine whether the receiver 300 is a primary receiver or a secondary receiver, as described above. In one implementation, the control circuitry 306 makes this determination by consulting data stored within the data storage 308. Such data storage 308 may be one or more volatile or nonvolatile memory components, such as dynamic random access memory (DRAM), static random access memory (SRAM), read-only memory (ROM), flash memory, or the like. In another example, the data storage 308 may be a magnetic disk drive, an optical disk drive, or other nonvolatile data storage unit.

In another example, the information consulted by the control circuitry 306 to determine whether the receiver 300 is a primary or secondary receiver may be stored in a removable data storage device 312 installed in a removable data storage device receptacle 310 of the receiver 300. In the case of a set-top box, the removable data storage device 312 may be a "smart card" often employed in a receiver 300 to store subscription-specific information, such as decoding or decryption keys for encrypted programming channels, such as channels carrying movies and other premium content. Typically, the media content service provider supplies the subscriber with the storage device 312.

In one example, the information may merely identify whether the receiver 300 is a primary or a secondary receiver. In other implementations, such information may be supplemented with data identifying other receivers that are associated with the subscriber of the receiver 300, thus allowing communication between the receiver 300 and other receivers. For example, a primary receiver may include data identifying other secondary receivers associated with the primary receiver, and vice-versa. Such information may include, for example, a serial number of other receiver-specific information, a subscriber identifier, or the like.

Depending on the particular embodiment, the information may be stored in the receiver 300 prior to the subscriber receiving the receiver 300, may be entered by an installer or the subscriber, such as by way of the user interface 314 (which may include a control panel incorporated into the receiver 300, or a remote control interface), or may be downloaded to the receiver 300 by way of the content input interface 302 or another data interface. In this last alternative, a source of the media content 320A, such as a satellite or cable head-end, may supply the information.

In yet another embodiment, the receiver 300 may be configured or programmed to only play the role of a primary or secondary receiver, thus eliminating the need for the control circuitry 306 to provide the capability of determining whether the receiver 300 is a primary or secondary receiver.

Figure 4:
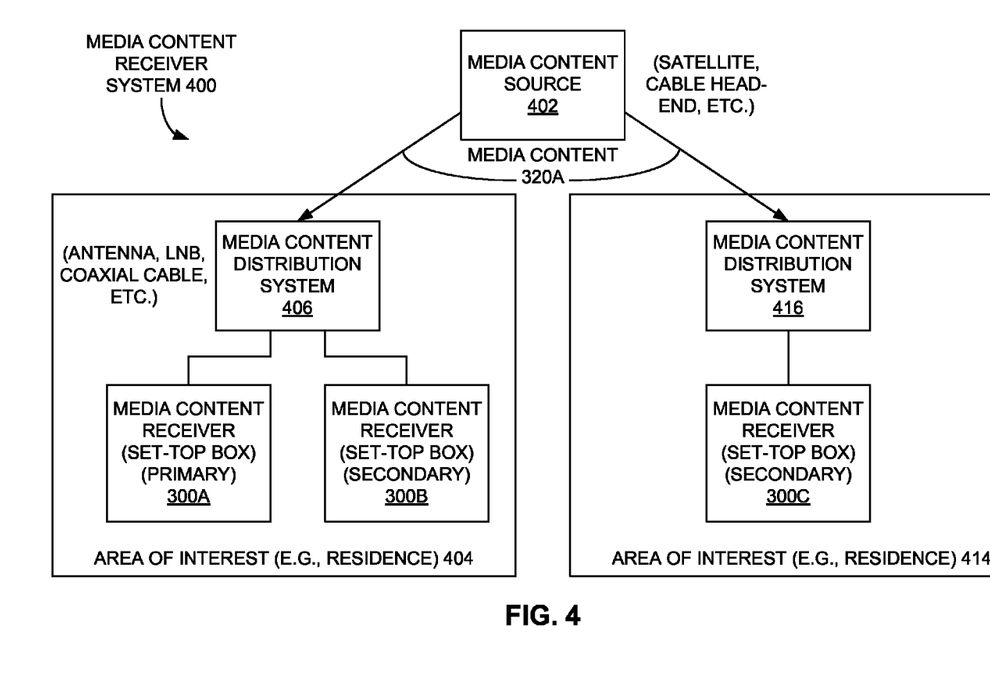
FIG. 4 is a block diagram of a media content receiver system according to an embodiment of the invention, wherein the system employs multiple media content receivers of the type portrayed in FIG. 3.

FIG. 4 illustrates a media content receiver system 400 including two media content receivers or set-top boxes 300: a primary receiver 300A and a secondary receiver 300B. More specifically, the primary receiver 300A is associated with a primary subscription, while the secondary receiver 300B is associated with a secondary subscription related or subordinate to the primary subscription. Both receivers 300A, 300B are coupled to a media content distribution system 406 configured to supply media content 320A to both receivers 300A, 300B via their respective media content input interfaces 302. While the particular example of FIG. 4 includes only two receivers 300A, 300B coupled to the media content distribution system 406, any number of receivers 300 may be coupled to the distribution system 406 in other arrangements.

The media content distribution system 406 is configured to receive the media content 320A from a media content source 402, such as a satellite or cable head-end, and deliver the content 320A to the receivers 300A, 300B. In the case of a satellite media content source 402, the media content distribution system 406 may include one or more satellite antennas, each with a low-noise block converter/feedhorn (LNBF) receiving the media content 320A, down-converting the content 320A, and forwarding the content 320A to each of the receivers 300A, 300B, typically via coaxial cable.

Each of the receivers 300A, 300B, as well as the media content distribution system 406 coupled thereto, are located within the same area of interest 404, such as a residence, dwelling, or other building. As a result, the primary receiver 300A and the secondary receiver 300B are both deemed controlled or controllable by the subscriber associated with the area of interest 404, as may be mandated by the content provider for a content subscription associated with the secondary receiver 300B.

In a separate area of interest 414, another secondary receiver 300C receives media content 320A from the media content source 402 via a second media content distribution system 416 located at the second area of interest 414. In one example, this remote secondary receiver 300C is associated with a secondary content subscription related to the subscription of the primary receiver 300A. Further, the remote secondary receiver 300 may have been originally employed within the first area of interest 404 before being relocated to the second area 414 for utilization therein, presumably by someone other than the subscriber associated with the first area 404. A goal of the embodiments described herein may then be to somehow degrade or hinder the operation of the remote secondary receiver 300C, presuming a condition of the secondary subscription of the remote receiver 300C is that the receiver 300C be used within the same area of interest 404 as the primary receiver 300A.

To that end, the primary receiver 300A attempts to communicate with both secondary receivers 300B, 300C to allow them to operate fully as allowed under their respective secondary subscriptions. In one implementation, the primary receiver 300A attempts to communicate with the secondary receivers 300B, 300C via a signal, message, or other communication via the media content distribution system 406 located in the first area 404.

For example, the primary receiver 300A may employ an extended version of the Digital Satellite Equipment Control (DiSEqC) protocol often utilized to facilitate communications among set-top boxes and components within a media content distribution system, such as LNBFs, signal switches, signal splitters, and so on. Generally, set-top boxes act as communication initiators, while the remaining components serve as responders that react and/or respond to communications from the set-top boxes. In the embodiments described herein, a primary set-top box may act as an initiator, while one or more secondary set-top boxes may serve as responders. Systems in which the primary and secondary receivers serve in the opposing role may also comport to the various aspects of the invention as discussed herein.

The embodiments discussed herein focus on the use of DiSEqC for communication between the receivers 300, other communication links or protocols that limit communication between receivers 300 to those receivers 300 within the same area on interest 404, 414 may be utilized in other implementations. For example, local-area networks, both wired (such as Ethernet) and/or wireless (such as Wi-Fi), may be used to facilitate communications between receivers in other systems.

In the specific example of FIG. 4, both receivers 300A, 300B of the first area 404 are coupled directly to the media content distribution system 406. In other examples, multiple receivers 300 may be connected serially, such that one receiver 300 may receive the media content 320A via at least one other receiver 300. In such a system, the receivers 300 may be configured to operate in a kind of "pass-through" mode, wherein each receiver 300 may be able to forward messages or signals not intended or addressed to them to other receivers 300.

Figure 5:
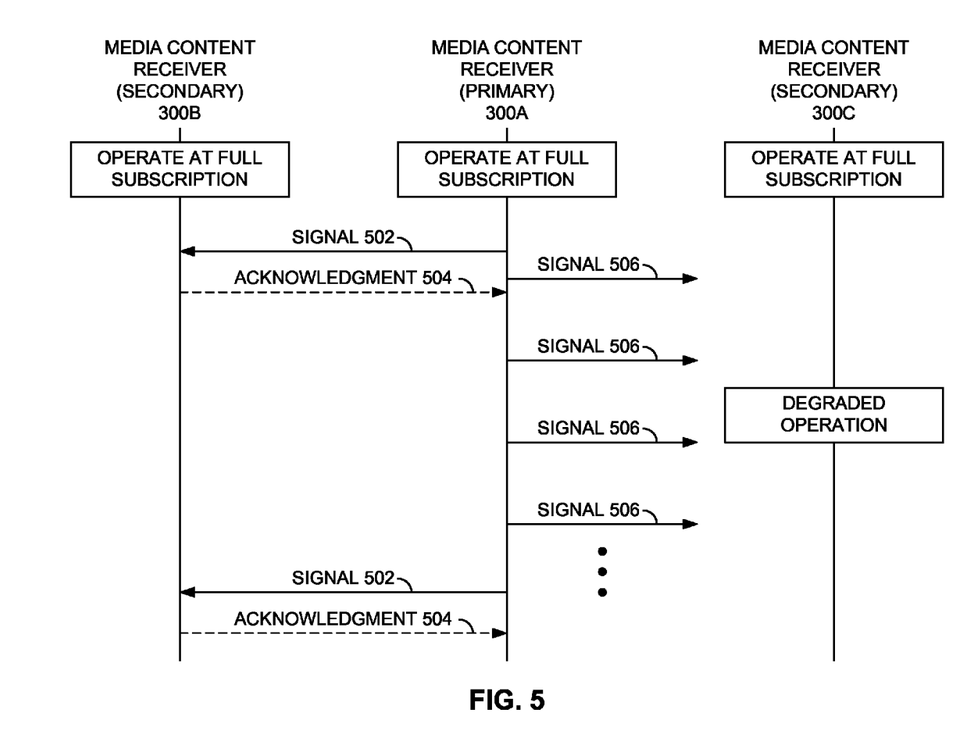
FIG. 5 is a communication diagram illustrating communications that may occur between the primary receiver and secondary receivers of FIG. 4 according to an embodiment of the invention.

FIG. 5 provides one example of communications that may take place among the receivers 300 to establish how the secondary receivers 300B, 300C are allowed to operate. In one implementation, each of the receivers 300 initially operates as allowed under its particular media content subscription. In other examples, the secondary receivers 300B, 300C may be required to operated in some lesser or degraded capacity, as is more completely discussed below.

As described above, the primary receiver 300A operates as allowed by its subscription. The primary receiver 300A also attempts to communicate with any secondary receivers 300 possibly residing within the first area 404 via the media content distribution network 406 to allow the secondary receivers 300 to operate as allowed under their respective subscriptions. Thus, the primary receiver 300A transmits a signal, message, or command 502, 506 to one or more secondary receivers 300 located within the first area of interest 404. In one example, the primary receiver 300A transmits a signal 502 addressed to the local secondary receiver 300B, and transmits a second signal 506 to the remote secondary receiver 300C, which the primary receiver 300A anticipates is still located within the first area 404. In other examples, the primary receiver 300A may transmit one or more broadcast signals not specifically addressed to any particular secondary receiver 300.

Additionally, the signals, messages, or commands 502, 506 transmitted by the primary receiver 300A may be encoded, encrypted, or otherwise protected from being easily intercepted and processed, thus helping to prevent unauthorized persons from enabling a secondary receiver, such as the remote secondary receiver 300C, that is not communicatively coupled with the primary receiver 300A.

Upon receiving the signal 502, the local secondary receiver 300B determines that it is communicatively coupled with the primary receiver 300A, and thus allows the local secondary receiver 300B to begin to operate (or, in the case of FIG. 5, continue to operate) as allowed under its associated content subscription. In the specific example of FIG. 5, the local primary receiver 300B responds to the signal 502 by transmitting an acknowledgment 504, which may be another signal, message, or command, to the primary receiver 300A to inform the primary receiver 300A of the presence of the secondary receiver 300B in the same area 404.

Presuming in some embodiments that the signals 502, 506, and possibly the acknowledgments 504, are addressed to specific primary and/or secondary receivers 300, the information stored in the various receivers 300 to allow this addressing effectively "binds" together the receivers 300 so that only successful communication between the primary receiver 300A and associated secondary receivers 300B, 300C may result in the secondary receivers 300B, 300C to operate as allowed by their corresponding subscriptions. Further, as alluded to above, the identities or addresses of the various targets of the messages or signals 502, 504, 506 may be identified by data stored within the data storage 308 or removable data storage device 312 of each affected receiver 300. Additionally, such information may be specified by way of a user or installer, or stored automatically therein via the media content source 402.

In at least one embodiment, the local secondary receiver 300B may be configured to degrade its level of operation compared to what is allowed under its subscription if the local secondary receiver 300B does not continue to receive a signal 502 within a predetermined period of time since the last signal 502 was received, or since the local secondary receiver 300B was powered on. In one example, the predetermined time period may a number of hours, such as 24 or 48 hours; however, any other time period deemed appropriate, possibly ranging from a portion of a second to a number of days, may be utilized in other implementations. In this case, the primary receiver 300A is configured to issue the signal 502 to the local secondary receiver 300B at least once every predetermined time period to ensure that the local secondary receiver 300B operates as expected under its subscription.

In some situations, the primary receiver 300A may transmit signals, messages, or commands 502, 506 when the primary receiver 300A is in a "standby" mode or state. Such a state may be defined by a prolonged lack of activity by a user or internal circuitry of the primary receiver 300A, suggesting that the primary receiver 300A is not being employed actively for the reception and processing of media content 320A. In another example, the primary receiver 300A may presume that the receiver 300 is inactive or on standby at certain predetermined times of the day (such as 3 AM) or week Transmission of the signals 502, 506 during such times may serve to reduce or eliminate any potential conflict between the signaling operations described above and the delivery of media content 320B. The signaling operations may also occur at other times, such as during channel changing and other operations normally undertaken by the primary receiver 300A. Such considerations may also control when the secondary receivers 300B, 300C are allowed to return acknowledgments 506 in some implementations.

Similar to the communication with the local secondary receiver 300B, the primary receiver 300A attempts to transmit a signal 506 to the remote secondary receiver 300C, possibly unaware that this secondary receiver 300C is not located in the same area 404, but in another area of interest 414. As the signal 506, such as that possibly transmitted via a DiSEqC protocol, cannot be transmitted via the media content distribution system 406 of the first area 404 to the second area 414, the remote secondary receiver 300C does not receive the signal 506. Thus, after a predetermined period of time after power-up, the remote media content receiver 300C begins a degraded or limited operation that represents less than what is allowed under its associated content subscription. Further, as a result of the remote secondary receiver 300C not receiving the signal 506, the remote receiver 300C does not attempt to transmit any acknowledgment back to the primary receiver 300A.

In a further implementation, when the primary receiver 300A does not receive an acknowledgment in response to a signal 506, the primary receiver 300A may continue to retransmit the signal 506 under some schedule or policy in an attempt to communication with the expected secondary receiver 300C.

In another embodiment, the secondary receivers 300B, 300C may initiate the communication between themselves and the primary receiver 300A to similar effect. Under this scenario, each of the secondary receivers 300B, 300C may not operate (or continue to operate) fully as specified under its respective subscription until an acknowledgment or other signal is returned from the primary receiver 300A to the secondary receiver 300B, 30C initiating the communication.

As depicted in FIG. 4, the remote secondary receiver 300C may be degraded or limited in any number of ways. For example, the remote secondary receiver 300A might only be permitted to transfer certain types of free content, such as basic cable channels and/or local television channels, to a connected television, regardless of the enhanced or premium programming permitted under the media content subscription associated with the secondary receiver 300C. In another example, the audio and/or video portion of the media content 320B being presented to the user may be disabled. In a more extreme example, the remote secondary receiver 300C may be completely disabled, thus prohibiting the presentation of any content 320B to the user. Other ways of degrading or limiting the operation of the remote secondary receiver 300C may be contemplated and employed in other implementations.

At least some embodiments as described herein thus allow a service provider or similarly interested entity to control the locations in which a content media receiver operating under a secondary subscription may operate. By employing communications links or protocols between receivers that are limited in effect to a particular area or areas of interest, the receivers may be configured to prevent secondary receivers from operating freely if geographical limitations on the use of the secondary receivers are violated. Such embodiments may thus aid a service provider in providing secondary subscriptions for the benefit of their subscribers while reducing or eliminating unauthorized access to the content.

While several embodiments of the invention have been discussed herein, other implementations encompassed by the scope of the invention are possible. For example, while various embodiments have been described within the context of a television set-top box, other types of media content receivers, including radio receivers, computers, mobile communication devices, and the like, may employ various aspects of the systems and methods described above. Further, while many of the descriptions above specifically employ the DiSEqC communication protocol known in satellite television receiver systems, other methods of communication between receivers may be employed to similar effect. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of enforcing a media content subscription for a media content receiver, the method comprising:

receiving a media content signal, which comprises a broadcast signal comprising a plurality of television programming channels, at both a primary and a secondary media content receiver from a media content source, wherein both the primary and secondary media content receivers receive the same media content signal;

for the media content receiver that is the primary receiver:

operating the primary receiver according to a content subscription associated with the primary receiver, said operating comprising providing media content from the media content signal received at the primary receiver; and attempting to communicate with any secondary receiver within an area of interest using an electronic communication that comprises an electronic message that is not specifically addressed to any particular secondary receiver, wherein said electronic communication is initiated at the primary content receiver independently of receiving the media content signal, and wherein said electronic message, if received by any secondary receiving within the area of interest, is configured such that it allows the secondary receiver to operate according to a content subscription associated with such secondary receiver; and for the media content receiver that is the secondary receiver:

if the primary receiver communicates with the secondary receiver using the electronic communication that is not specially addressed to any particular secondary receiver, operating the secondary receiver according to a content subscription associated with the secondary receiver; and if the primary receiver does not communicate with the secondary receiver, operating the secondary receiver at a reduced level than determined by the content subscription associated with the secondary receiver, wherein the reduced level permits the transfer, receipt, and display of a subset of the content permitted by the content subscription, said operating the second receiver comprising providing media content from the media content signal received at the secondary receiver.

2. The method of claim 1, wherein:

attempting to communicate with the secondary receiver comprises sending a signal from the primary receiver toward the secondary receiver; and communication occurs if the secondary receiver receives the signal from the primary receiver.

3. The method of claim 2, wherein:

sending the signal from the primary receiver comprises sending the signal from the primary receiver over a media content distribution medium configured to carry media content to the primary receiver and the secondary receiver.

4. The method of claim 3, wherein:

the signal is sent over the media content distribution medium as a command using a version of a Digital Satellite Equipment Control communication protocol.

5. The method of claim 2, further comprising:

operating the secondary receiver according to the content subscription associated with the secondary receiver after powering up the secondary receiver;

wherein operating the secondary receiver at the reduced level occurs if the secondary receiver does not receive the signal within a predetermined period after powering up the secondary receiver.

6. The method of claim 2, further comprising:

operating the secondary receiver according to the subscription level associated with the secondary receiver after receiving a previous signal;

wherein operating the secondary receiver at the reduced level occurs if the secondary receiver does not receive the signal within a predetermined period after receiving the previous signal; and wherein sending the signal from the primary receiver occurs at least once per predetermined time period.

7. The method of claim 1, wherein:

determining whether the media content receiver is a primary receiver or a secondary receiver occurs in the media content receiver.

8. The method of claim 7, wherein:

determining whether the media content receiver is a primary receiver or a secondary receiver is based on data stored within the media content receiver.

9. The method of claim 7, wherein:

determining whether the media content receiver is a primary receiver or a secondary receiver is based on data stored in a removable data storage device installed in the media content receiver.

10. The method of claim 1, wherein:

operating the secondary receiver at the reduced level comprises at least one of reducing the amount of media content available for presentation to a user, disabling one of an audio portion and a video portion of the media content presented to the user, and disabling the secondary receiver.

* * * * *